(12) United States Patent
Gutierrez Estevez

(10) Patent No.: US 12,218,809 B2
(45) Date of Patent: Feb. 4, 2025

(54) METHOD AND APPARATUS FOR DISCRIMINATING SERVICE EXPERIENCE ANALYTICS

(71) Applicant: Samsung Electronics Co., Ltd., Suwon-si (KR)

(72) Inventor: David Gutierrez Estevez, Chertsey (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 250 days.

(21) Appl. No.: 17/445,066

(22) Filed: Aug. 13, 2021

(65) Prior Publication Data

US 2022/0086062 A1    Mar. 17, 2022

(30) Foreign Application Priority Data

Aug. 13, 2020  (GB) ...................................... 2012634
Jul. 26, 2021  (GB) ...................................... 2110722

(51) Int. Cl.
*H04L 41/50*     (2022.01)
*H04W 24/10*    (2009.01)

(52) U.S. Cl.
CPC ......... *H04L 41/5032* (2013.01); *H04W 24/10* (2013.01)

(58) Field of Classification Search
CPC .................................................. H04L 41/5032
See application file for complete search history.

(56) References Cited

U.S. PATENT DOCUMENTS

| | | | |
|---|---|---|---|
| 11,310,731 B1 * | 4/2022 | Feder | H04W 36/32 |
| 11,388,070 B2 * | 7/2022 | Lee | H04L 41/14 |
| 2020/0112868 A1 * | 4/2020 | Shariat | H04W 48/06 |
| 2020/0358670 A1 * | 11/2020 | Lee | H04L 41/5067 |

(Continued)

FOREIGN PATENT DOCUMENTS

| | | |
|---|---|---|
| WO | 2020/147926 A1 | 7/2020 |
| WO | 2020/224492 A1 | 11/2020 |
| WO | 2021/063840 A1 | 4/2021 |

OTHER PUBLICATIONS

Combined Search and Examination Report under Sections 17 & 18(3) in connection with United Kingdom Patent Application No. GB2110722.2, Dec. 22, 2021, 8 pages.

(Continued)

*Primary Examiner* — Guang W Li

(57) ABSTRACT

A method of providing service experience analytics in a network is described. The method comprises: requesting or subscribing, by a service consumer from or to a network data analytics function (NWDAF) of the network, service experience analytics for one or more application(s) and/or service experience analytics for one or more network slice(s), via a request or a subscription; determining, by the NWDAF, whether to provide the service experience analytics for one or more application(s) and/or the service experience analytics for one or more network slice(s), based on the request or the subscription; providing, by the NWDAF to the service consumer, the service experience analytics for one or more application(s) and/or the service experience analytics for one or more network slice(s), according to a result of the determining. A network is also described.

13 Claims, 1 Drawing Sheet

(56) References Cited

U.S. PATENT DOCUMENTS

| | | | | |
|---|---|---|---|---|
| 2020/0396677 | A1* | 12/2020 | Estevez | H04L 41/145 |
| 2021/0337553 | A1* | 10/2021 | Chong | H04L 41/5019 |
| 2021/0392540 | A1* | 12/2021 | Chong | H04W 28/0268 |
| 2022/0060388 | A1* | 2/2022 | Li | H04L 41/085 |
| 2022/0272010 | A1* | 8/2022 | Marquezan | H04L 43/20 |
| 2022/0329493 | A1* | 10/2022 | Hong | G06F 16/2458 |
| 2022/0337486 | A1* | 10/2022 | Hong | H04L 41/14 |
| 2022/0400370 | A1* | 12/2022 | Yang | H04W 24/08 |
| 2022/0417799 | A1* | 12/2022 | Schnitzler | H04L 41/5003 |
| 2023/0069455 | A1* | 3/2023 | Marquezan | H04L 43/04 |

OTHER PUBLICATIONS

International Search Report and Written Opinion of the International Searching Authority in connection with International Application No. PCT/KR2021/010829 issued Nov. 18, 2021, 10 pages.

3GPP TS 23.288 V16.4.0 (Jul. 2020); Technical Specification; 3rd Generation Partnership Project; Technical Specification Group Services and System Aspects; Architecture enhancements for 5G System (5GS) to support network data analytics services (Release 16), Jul. 9, 2020, 66 pages.

3GPP TS 29.520 V16.4.0 (Jun. 2020); Technical Specification; 3rd Generation Partnership Project; Technical Specification Group Core Network and Terminals; 5G System; Network Data Analytics Services; Stage 3; (Release 16); Jun. 2020, 91 pages.

Catt et al., "Clarifications on policy decisions based on network analytics", S2-2003330 (revision of S2-2002931), SA WG2 Meeting #S2-138E, Electronic, Elbonia, Apr. 20-24, 2020, 6 pages.

Samsung, "Service experience analytics discrimination", S2-2005066, 3GPP TSG-SA2 Meeting #140-E, Elbonia, Aug. 19-Sep. 1, 2020, 4 pages.

Supplementary European Search Report dated Nov. 16, 2023, in connection with European Patent Application No. 21856294.0, 13 pages.

3GPP TS 23.501 V16.5.1 (Aug. 2020); Technical Specification; 3rd Generation Partnership Project; Technical Specification Group Services and System Aspects; System architecture for the 5G System (SGS); Stage 2(Release 16); 440 pages.

3GPP TS 23.502 V16.5.1 (Aug. 2020) Technical Specification; 3rd Generation Partnership Project; Technical Specification Group Services and System Aspects; Procedures for the 5G System (SGS); Stage 2 (Release 16); 594 pages.

* cited by examiner

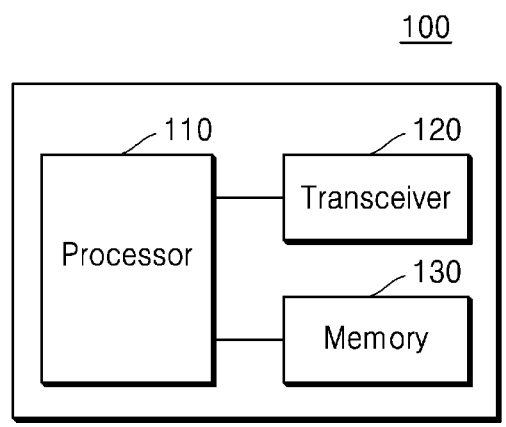

METHOD AND APPARATUS FOR DISCRIMINATING SERVICE EXPERIENCE ANALYTICS

CROSS-REFERENCE TO RELATED APPLICATIONS

This application is based on and claims priority under 35 U.S.C. § 119 to Great Britain Application No. 2110722.2, filed Jul. 26, 2021, and Application No. 2012634.8, filed Aug. 13, 2020, in the Great Britain Intellectual Property Office, the disclosures of which are incorporated by reference herein in their entirety.

BACKGROUND

1. Field

The present disclosure relates to a network data analytics function (NWDAF) of a network.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 giga-Hertz (GHz) bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as technologies connectivity network where humans generate and consume information, is now evolving to the Internet of things (IoT) where the cloud server has IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

SUMMARY

It is one aim of the present disclosure, amongst others, to provide a method and a network which at least partially obviates or mitigates at least some of the disadvantages of the prior art, whether identified herein or elsewhere. For instance, it is an aim of embodiments of the disclosure to provide a method of providing service experience analytics in a network that includes service experience analytics discrimination.

According to an embodiment of the disclosure, there is provided method of providing service experience analytics in a network, the method comprising: requesting or subscribing, by a service consumer from or to a network data analytics function (NWDAF) of the network, service experience analytics for one or more application(s) and/or service experience analytics for one or more network slice(s), via a request or a subscription, determining, by the NWDAF, whether to provide the service experience analytics for one or more application(s) and/or the service experience analytics for one or more network slice(s), based on the request or the subscription, providing, by the NWDAF to the service consumer, the service experience analytics for one or more application(s) and/or the service experience analytics for one or more network slice(s), according to a result of the determining.

In one embodiment, the request or the subscription indicates: (i) an analytics ID set to "service experience," (ii) a target of analytics reporting selected from: one or more globally unique subscription permanent identifier (SUPI(s)), one or more internal group identifier(s), or "any UE," (iii) analytics filter information, and optionally, (iv) a maximum number of objects and a maximum number of SUPIs, and the determining, by the NWDAF, whether to provide the service experience analytics for one or more application(s) and/or the service experience analytics for one or more network slice(s), based on the request or the subscription, comprises determining, by the NWDAF, whether to provide the service experience analytics for one or more application(s) and/or the service experience analytics for one or more network slice(s), based on the target of analytics reporting and the analytics filter information indicated in the request or the subscription.

In one embodiment, the analytics filter information defines respective application ID(s) identifying one or more application(s) for which the service experience analytics are requested or subscribed, and the determining, by the NWDAF, whether to provide the service experience analytics for one or more application(s) and/or the service experience analytics for one or more network slice(s), based on the target of analytics reporting and the analytics filter information indicated in the request or the subscription, comprises determining, by the NWDAF, to provide the service experience analytics for one or more application(s) identified by the respective application ID(s).

In one embodiment, the analytics filter information defines respective S-NSSAI(s) identifying one or more network slice(s) for which the service experience analytics are requested or subscribed, and the determining, by the NWDAF, whether to provide the service experience analytics for one or more application(s) and/or the service experience analytics for one or more network slice(s), based on the target of analytics reporting and the analytics filter information indicated in the request or the subscription, comprises determining, by the NWDAF, to provide the service experience analytics for one or more network slice(s) identified by the respective S-NSSAI(s).

In one embodiment, the determining, by the NWDAF, whether to provide the service experience analytics for one or more application(s) and/or the service experience analytics for one or more network slice(s), based on the target of analytics reporting and the analytics filter information indicated in the request or the subscription, comprises determining, by the NWDAF, to provide the service experience analytics for one or more application(s) and the service experience analytics for one or more network slice(s), if the NWDAF is unable to determine whether to provide the service experience analytics for one or more application(s) and/or the service experience analytics for one or more network slice(s), based on the request or the subscription.

In one embodiment, the requesting or subscribing, by the service consumer from or to the NWDAF of the network, the service experience analytics for one or more application(s) and/or the service experience analytics for one or more network slice(s), via the request or the subscription, comprises requesting or subscribing, by the service consumer from or to the NWDAF of the network, the service experience analytics for one or more application(s) and the service experience analytics for one or more network slice(s) via separate requests or separate subscriptions, if different values of the target of analytics reporting or the analytics filter information are required for the separate requests or the separate subscriptions.

In one embodiment, the determining, by the NWDAF, whether to provide the service experience analytics for one or more application(s) and/or the service experience analytics for one or more network slice(s), based on the request or the subscription, comprises determining, by the NWDAF, to provide the service experience analytics for only one or more application(s) or the service experience analytics for only one or more network slice(s), based on the request or the subscription.

In one embodiment, the providing, by the NWDAF to the service consumer, the service experience analytics for one or more application(s) comprises providing, by the NWDAF to the service consumer, the service experience analytics for one or more application(s), wherein the service experience analytics for one or more application(s) comprises service experience statistics for one or more application(s) and/or service experience predictions for one or more application(s).

In one embodiment, the service experience statistics for one or more application(s) and/or the service experience predictions for one or more application(s) respectively include a spatial validity thereof and/or a validity period thereof.

In one embodiment, the service experience statistics for one or more application(s) and/or the service experience predictions for one or more application(s) respectively include service experience statistics for each application of one or more application(s) and/or the service experience predictions for each application of one or more application(s).

In one embodiment, the providing, by the NWDAF to the service consumer, the service experience analytics for one or more network slice(s) comprises providing, by the NWDAF to the service consumer, the service experience analytics for one or more network slice(s), wherein the service experience analytics for one or more network slice(s) comprises service experience statistics for one or more network slice(s) and/or service experience predictions for one or more network slice(s).

In one embodiment, the service experience statistics for one or more network slice(s) and/or the service experience predictions for one or more network slice(s) respectively include a spatial validity thereof and/or a validity period thereof.

In one embodiment, the service experience statistics for one or more network slice(s) and/or the service experience predictions for one or more network slice(s) respectively include service experience statistics for each network slice of one or more network slice(s) and/or the service experience predictions for each network slice of one or more network slice(s) and/or wherein the service experience statistics for one or more application(s) and/or the service experience predictions for one or more application(s) respectively include service experience statistics for each application of one or more application(s) and/or the service experience predictions for each application of one or more application(s).

In one embodiment, the service experience statistics for the application(s) or the service experience statistics for the network slice(s) are provided individually per UE or group of UEs, or globally, averaged per application or averaged across a set of applications on a network slice.

According to an embodiment of the disclosure, there is provided a network comprising a network data analytics function (NWDAF) and a service consumer, wherein the service consumer is configured to request or subscribe, from or to the NWDAF, service experience analytics for one or more application(s) and/or service experience analytics for one or more network slice(s), via a request or a subscription, and wherein the NWDAF is configured to: determine whether to provide the service experience analytics for one or more application(s) and/or the service experience analytics for one or more network slice(s), based on the request or the subscription, and provide, to the service consumer, the service experience analytics for one or more application(s) and/or the service experience analytics for one or more network slice(s), according to a result of the determining.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWING

For a more complete understanding of the present disclosure and its advantages, reference is now made to the following description taken in conjunction with the accompanying drawing, in which like reference numerals represent like parts:

FIG. 1 illustrates a network entity according to embodiments of the present disclosure.

DETAILED DESCRIPTION

FIG. 1, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

According to the present disclosure there is provided a method, as set forth in the appended claims. Also provided is a network. Other features of the disclosure will be apparent from the dependent claims, and the description that follows.

The network data analytics function (NWDAF) provides Network Data Analytics Function Services for a 5G network or system, as defined in 3GPP TS 23.288 (Rel-16 NWDAF), which is incorporated herein in entirety by reference.

Observed service experience analytics is supported in Rel-16 NWDAF. It was agreed to use the same analytics type to provide service experience analytics for an application and for a network slice.

Service experience analytics are derived using UE-level measurements; both types (i.e., service experience analytics for an application and for a network slice) can use a single UE, a group of UEs, or all UEs (using the application/slice). However, it does not make sense to derive network slice service experience using a single UE metric.

However, it is not possible to distinguish between the two types of service experience analytics from a subscription/request service definition. Furthermore, multiple applications not on the same network slice are not supported.

Hence, there is a need to improve providing of service experience analytics.

Method

The first aspect provides a method of providing service experience analytics in a network, the method comprising:
  requesting or subscribing, by a service consumer from or to a network data analytics function (NWDAF) of the network, service experience analytics for one or more application(s) and/or service experience analytics for one or more network slice(s), via a request or a subscription;
  determining, by the NWDAF, whether to provide the service experience analytics for one or more application(s) and/or the service experience analytics for one or more network slice(s), based on the request or the subscription;
  providing, by the NWDAF to the service consumer, the service experience analytics for one or more application(s) and/or the service experience analytics for one or more network slice(s), according to a result of the determining.

In this way, service experience analytics discrimination for NWDAF is provided, since the NWDAF determines whether to provide the service experience analytics for one or more application(s) and/or the service experience analytics for one or more network slice(s), based on the request or the subscription. It should be understood that the request or the subscription may not explicitly identify or does not explicitly identify one or more application(s) and/or one or more network slice(s) for which the service experience analytics are requested or subscribed. In one example, the request or the subscription does not explicitly identify one or more application(s) and/or one or more network slice(s) for which the service experience analytics are requested or subscribed. That is, the request or the subscription may at most only implicitly identify one or more application(s) and/or one or more network slice(s), such that one or more application(s) and/or one or more network slice(s) for which the service experience analytics are requested or subscribed must be determined (i.e., established, worked out) from the request or the subscription. In one example, the request or the subscription at most only implicitly identifies one or more application(s) and/or one or more network slice(s) for which the service experience analytics are requested or subscribed. In other words, the NWDAF discriminates between the two types of service experience analytics (i.e., for an application and for a network slice), thereby enabling output of corresponding service experience analytics, for example by adaptation of all data inputs and output analytics so that the discrimination can be carried out at by the NWDAF. That is, the NWDAF selectively provides the service experience analytics for one or more application(s) and/or the service experience analytics for one or more network slice(s), based on (for example according to, using, determined from) the request or the subscription.

In one example, the service consumer is a network function (NF) or an operations, administration and maintenance (OAM).

In summary, the method according to the first aspect may comprise inter alia:
1. Specification of which event filters are mandatory and which event filters are not mandatory, when a service consumer requests/subscribes to i) service experience analytics for an application, and ii) service experience analytics for a network slice; and/or
2. A mechanism allowing differentiation of areas of interest when the service experience analytics are requested/subscribed for an application and for a network slice. For example, if the two types of analytics are requested with different areas of interest, two requests/subscriptions instead may be required; and/or
3. Adaptation of output analytics formatting to allow for NWDAF to provide i) service experience analytics for a network slice only; ii) service experience analytics for an application only; and iii) service experience analytics for both a network slice and application(s); and/or
4. Other additional minor alignments (e.g., unfeasibility to provide service experience for a network slice based only on one UE/SUFI, possibility of providing multiple service experience analytics for multiple applications without a linkage to the network slice analytics, etc.).

Particularly, according to Rel-16 NWDAF:
1. There is no way to distinguish between the two types of service experience analytics from the subscription/request service definition;
2. Input mandatory requirements for each type of analytics subscription/request are not mentioned, hence the two analytics types cannot be well differentiated;
3. Multiple applications not on the same network slice are not properly supported when the service consumer requests service experience analytics for both applications and network slice;
4. Output analytics tables should be designed to account for either type only or both;
5. Location considerations: need to specify what to do when the area of interests for application and network slice are not the same (missing from Rel-16 NWDAF);
6. There remains a need to specify how NWDAF knows when UE IDs need to be retrieved since "any UE" may apply for an application too.

Requesting or Subscribing.

The method comprises requesting or subscribing (also referred to as requesting/subscribing), by the service consumer from or to the NWDAF of the network, the service experience analytics for one or more application(s) and/or service experience analytics for one or more network slice(s), via the request or the subscription.

It should be understood that the method thus comprises:
requesting, by the service consumer from the NWDAF of the network, the service experience analytics for one or more application(s) and/or service experience analytics for one or more network slice(s), via the request; or
subscribing, by the service consumer to the NWDAF of the network, the service experience analytics for one or more application(s) and/or service experience analytics for one or more network slice(s), via the subscription.

In one example, the request or the subscription indicates: analytics filter information and target of analytics reporting. That is, the method may provide the service experience analytics for one or more application(s) and/or the service experience analytics for one or more network slice(s), using the analytics filter information, for example to determine whether to provide the service experience analytics for one or more application(s) and/or the service experience analytics for one or more network slice(s), and the target of analytics reporting, for example to define output of the service experience analytics for one or more application(s) and/or service experience analytics for one or more network slice(s).

In one example, the request or the subscription indicates: (i) an analytics ID set to "service experience"; (ii) a target of analytics reporting selected from: one or more globally unique subscription permanent identifier (SUPI(s)); one or more internal group identifier(s); or "any UE"; (iii) analytics filter information; and optionally, (iv) a maximum number of objects and a maximum number of SUPIs; and wherein determining, by the NWDAF, whether to provide the service experience analytics for one or more application(s) and/or the service experience analytics for one or more network slice(s), based on the request or the subscription, comprises determining, by the NWDAF, whether to provide the service experience analytics for one or more application(s) and/or the service experience analytics for one or more network slice(s), based on the target of analytics reporting and the analytics filter information indicated in the request or the subscription.

In one example, requesting or subscribing, by the service consumer from or to the NWDAF of the network, the service experience analytics for one or more application(s) and/or the service experience analytics for one or more network slice(s), via the request or the subscription, comprises requesting or subscribing, by the service consumer from or to the NWDAF of the network, the service experience analytics for one or more application(s) and the service experience analytics for one or more network slice(s) via separate requests or separate subscriptions, if different values of the target of analytics reporting or the analytics filter information are required for the separate requests or the separate subscriptions. For example, if service experience for both application(s) and network slice is desired but the target of analytics reporting or analytics filter information values (e.g., area of interest) need to be different, separate subscriptions/requests may be provided by the service consumer. That is, the method may manage a request or a subscription for one or more network slice(s) and/or one or more application(s) where each of the requests or subscriptions has different analytics filter information values.

By way of example, updates of the Rel-16 NWDAF specification enabling discrimination according to the method according to the first aspect is described below.

Rel-16 NWDAF specifies how the NWDAF can provide observed service experience (i.e., average of observed service MoS and/or variance of observed service MoS indicating service MOS distribution for services such as audio-visual streaming as well as services that are not audio-visual streaming such as V2X and web browsing services) analytics, in the form of statistics or predictions, to a service consumer. The service consumer may be an NF (e.g., PCF), or the OAM. The observed service experience analytics may provide one or both of the following:

Service experience for a network slice: service experience for a group of UEs or any UE for a given application or a set of applications or any application (i.e., all applications) in a network slice;

Service experience for an application: service experience for a UE or a group of UEs or any UE in an application or a set of applications.

Therefore, the observed service experience may be provided in Rel-16 NWDAF individually per UE or group of UEs, or globally, averaged per application or averaged across a set of applications on a network slice.

Discrimination according to the method according to the first aspect may be achieved by updating the Rel-16 NWDAF specification such that the service consumer of these analytics indicates in the request or subscription:
  (i) Analytics ID set to "service experience";
  (ii) The target of analytics reporting: one or more SUPI(s) or internal group identifier(s), or "any UE";
  (iii) Analytics filter information e.g., as defined in Table 1; and
  (iv) optionally, maximum number of objects and maximum number of SUPIs.

Analytics Filter Information.

Service experience analytics discrimination may be achieved by specifying which event filters of the analytics filter information are mandatory, as described below.

In one example, the analytics filter information defines respective application ID(s) identifying one or more application(s) for which the service experience analytics are requested or subscribed; and
  wherein determining, by the NWDAF, whether to provide the service experience analytics for one or more application(s) and/or the service experience analytics for one or more network slice(s), based on the target of analytics reporting and the analytics filter information indicated in the request or the subscription, comprises determining, by the NWDAF, to provide the service experience analytics for one or more application(s) identified by the respective application ID(s).

That is, if one or more application ID(s) identifying one or more application(s) are defined by the analytics filter information, the service experience analytics are provided for one or more application(s) identified by the respective application ID(s). In other words, one or more application ID(s) are mandatory if service experience analytics are to be provided for one or more application(s). That is, the method may differentiate which analytics filter information is mandatory for each type of service experience analytics (e.g., application ID for application service experience, S-NSSAI for network slice service experience). It should be understood that if one or more application ID(s) are defined by the analytics filter information, the rest of the analytics filter information applies to any network slice (i.e., all network slices) for one or more application(s) identified by the respective application ID(s). Conversely, it should be understood that if no application ID(s) are defined by the analytics filter information, the rest of the analytics filter information applies to any application (i.e., all applications) for one or more network slice(s) identified by the respective S-NSSAI(s).

In one example, the Analytics Filter Information defines respective S-NSSAI(s) identifying one or more network slice(s) for which the service experience analytics are requested or subscribed; and
  wherein determining, by the NWDAF, whether to provide the service experience analytics for one or more application(s) and/or the service experience analytics for one or more network slice(s), based on the target of analytics reporting and the analytics filter information indicated in the request or the subscription, comprises determining, by the NWDAF, to provide the service experience analytics for one or more network slice(s) identified by the respective S-NSSAI(s).

That is, if one or more S-NSSAI(s) identifying one or more network slice(s) are defined by the analytics filter information, the service experience analytics are provided for one or more network slice(s) identified by the respective S-NSSAI(s). In other words, one or more S-NSSAI(s) are mandatory if service experience analytics are to be provided for one or more network slice(s). It should be understood that if one or more network slice(s) are defined by the analytics filter information, the rest of the analytics filter information applies to any application (i.e., all applications) for one or more network slice(s) identified by the respective S-NSSAI(s). Conversely, it should be understood that if no S-NSSAI(s) are defined by the analytics filter information, the rest of the analytics filter information applies to any network slice (i.e., all network sliced) for one or more application(s) identified by the respective application ID(s).

It should be understood that if one or more application ID(s) are defined by the analytics filter information and one or more network slice(s) are defined by the analytics filter information, the rest of the analytics filter information applies to applies to any network slice (i.e., all network slices) for one or more application(s) identified by the respective application ID(s) and to any application (i.e., all applications) for one or more network slice(s) identified by the respective S-NSSAI(s).

In one example, the analytics filter information defines an area of interest for which the service experience analytics are requested or subscribed; and
  wherein providing, by the NWDAF to the service consumer, the service experience analytics for one or more application(s) and/or the service experience analytics for one or more network slice(s) comprises providing, by the NWDAF to the service consumer, the service experience analytics for one or more application(s) and/or the service experience analytics for one or more network slice(s) for the area of interest.

Determining.

The method comprises determining, by the NWDAF, whether to provide the service experience analytics for one or more application(s) and/or the service experience analytics for one or more network slice(s), based on the request or the subscription. That is, the NWDAF discriminates, based on the request or the subscription, whether to provide:
  1. the service experience analytics for one or more application(s); or
  2. the service experience analytics for one or more network slice(s); or
  3. the service experience analytics for one or more application(s) and the service experience analytics for one or more network slice(s).

It should be understood that the request or the subscription may not explicitly identify or does not explicitly identify one or more application(s) and/or one or more network slice(s) for which the service experience analytics are requested or subscribed. In one example, the request or the subscription does not explicitly identify one or more application(s) and/or one or more network slice(s) for which the service experience analytics are requested or subscribed. That is, the request or the subscription may at most only implicitly identify one or more application(s) and/or one or more network slice(s), such that one or more application(s) and/or one or more network slice(s) for which the service experience analytics are requested or subscribed must be determined (i.e., established, worked out) from the request or the subscription. In one example, the request or the subscription at most only implicitly identifies one or more application(s) and/or one or more network slice(s) for which the service experience analytics are requested or subscribed.

In one example, determining, by the NWDAF, whether to provide the service experience analytics for one or more application(s) and/or the service experience analytics for one or more network slice(s), based on the target of analytics reporting and the analytics Filter Information indicated in the request or the subscription, comprises determining, by the NWDAF, to provide the service experience analytics for one or more application(s) and the service experience analytics for one or more network slice(s), if the NWDAF is unable to determine whether to provide the service experience analytics for one or more application(s) and/or the service experience analytics for one or more network slice(s), based on the request or the subscription. For example, if no application ID is provided, the rest of the analytics filter information applies to any application (i.e., all applications) in one or more network slice(s). Conversely, for example, if no S-NSSAI is provided, the rest of the analytics filter information applies to any network slice (i.e., all network slices) for one or more application(s). That is, the method may determine the service experience analytics to be provided when, for example even when, the NWDAF cannot determined (for example identify) whether the request or subscription is for one or more application(s) or one or more network slice(s).

In one example, determining, by the NWDAF, whether to provide the service experience analytics for one or more application(s) and/or the service experience analytics for one or more network slice(s), based on the request or the subscription, comprises determining, by the NWDAF, to provide the service experience analytics for only one or more application(s) or the service experience analytics for only one or more network slice(s), based on the request or the subscription.

Providing.

The method comprises providing, by the NWDAF to the service consumer, the service experience analytics for one or more application(s) and/or the service experience analytics for one or more network slice(s), according to the result of the determining.

In one example, the result of the determining specifies providing, by the NWDAF to the service consumer, the service experience analytics for one or more application(s), for example for only one or more application(s). In one example, the result of the determining specifies providing, by the NWDAF to the service consumer, the service experience analytics for one or more network slice(s), for example for only one or more network slice(s). In one example, the result of the determining specifies providing, by the NWDAF to the service consumer, the service experience analytics for one or more application(s) and for one or more network slice(s).

In one example, providing, by the NWDAF to the service consumer, the service experience analytics for one or more application(s) and/or the service experience analytics for one or more network slice(s), according to a result of the determining comprises notifying the service experience analytics to the service consumer as specified in 3GPP TS 23.288. For example, the NWDAF may or shall notify the result of the analytics to the consumer as specified in 3GPP TS 23.288.

In one example, providing, by the NWDAF to the service consumer, the service experience analytics for one or more application(s) comprises providing, by the NWDAF to the service consumer, the service experience analytics for one or more application(s), wherein the service experience analytics for one or more application(s) comprises service experience statistics for one or more application(s) and/or service experience predictions for one or more application(s). That is, the service experience analytics may include the service experience statistics and/or the service experience predictions for one or more application(s).

In one example, the service experience statistics for one or more application(s) and/or the service experience predictions for one or more application(s) respectively include a spatial validity thereof and/or a validity period thereof. That is, the spatial validity (i.e., the area for which these service experience analytics for one or more application(s) applies) and/or the validity period (i.e., the validity period for which these service experience analytics for one or more application(s) applies such as defined in REL-16 NWDAF) may be defined.

In one example, the service experience statistics for one or more application(s) and/or the service experience predictions for one or more application(s) respectively include service experience statistics for each application of one or more application(s) and/or the service experience predictions for each application of one or more application(s). That is, these service experience analytics may be provided for each application of one or more application(s), for example from 0 to max applications (i.e., 0 . . . max, where max is a maximum allowed size of the list). In contrast, conventionally, the service experience statistics and the service experience predictions included a single list, such that if the service experience analytics were requested for a single application, the service experience analytics were nevertheless provided for both the application and the network slice used for that application, together with others according instead to the method according to the first aspect, if the service experience analytics are determined to be only provided for a single application, a size of the network slice list is 0. Similarly, if the service experience analytics are determined to be only provided for a single network slice, a size of the application list is 0. That is, the method may provide service experience analytics distinguishing service experience values for a network slice and service experience values for an application.

In one example, providing, by the NWDAF to the service consumer, the service experience analytics for one or more network slice(s) comprises providing, by the NWDAF to the service consumer, the service experience analytics for one or more network slice(s), wherein the service experience analytics for one or more network slice(s) comprises service experience statistics for one or more network slice(s) and/or service experience predictions for one or more network slice(s). That is, the service experience analytics may include the service experience statistics and/or the service experience predictions for one or more network slice(s).

In one example, the service experience statistics for one or more network slice(s) and/or the service experience predictions for one or more network slice(s) respectively include a spatial validity thereof and/or a validity period thereof. That is, the spatial validity (i.e., the area for which these service experience analytics for one or more network slice(s) applies) and/or the validity period (i.e., the validity period for which these service experience analytics for one or more network slice(s) applies such as defined in REL-16 NWDAF) may be defined.

In one example, the service experience statistics for one or more network slice(s) and/or the service experience predictions for one or more network slice(s) respectively include service experience statistics for each network slice of one or more network slice(s) and/or the service experience predictions for each network slice of one or more network slice(s). That is, these service experience analytics may be provided for each network slice of one or more network slice(s), for example from 0 to max network slices (i.e., 0 . . . max, where max is size of list). In contrast, conventionally, the service experience statistics and the service experience predictions included a single list, such that if the service experience analytics were requested for a single network slice, the service experience analytics were nevertheless provided for both the network slice and for all application(s) using the network slice. According instead to the method according to the first aspect, if the service experience analytics are determined to be only provided for a single network slice, a size of the application list is 0. Similarly, if the service experience analytics are determined to be only provided for a single Application, a size of the network slice list is 0. That is, the method may provide service experience analytics distinguishing service experience values for a network slice and service experience values for an application.

In one example, the service experience statistics for the application(s) or the service experience statistics for the network slice(s) are provided individually per UE or group of UEs, or globally, averaged per application or averaged across a set of applications on a network slice.

Network.

The second aspect provides a network comprising a network data analytics Function (NWDAF) and a service consumer;

wherein the service consumer is configured to request or subscribe, from or to the NWDAF, service experience analytics for one or more application(s) and/or service experience analytics for one or more network slice(s), via a request or a subscription; and wherein the NWDAF is configured to:

determine whether to provide the service experience analytics for one or more application(s) and/or the service experience analytics for one or more network slice(s), based on the request or the subscription; and provide, to the service consumer, the service experience analytics for one or more application(s) and/or the service experience analytics for one or more network slice(s), according to a result of the determining.

The network, the NWDAF, the service consumer, the requesting, the subscribing, the request, the subscription, the determining, the providing and/or the result of the determining may be as described with respect to the first aspect.

The network may be configured to implement any method step as described with respect to the first aspect.

In one example, the network comprises and/or is a 5G network.

In one example, the service consumer is a network function (NF) or an operations, administration and maintenance (OAM).

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the disclosure, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the disclosure, as set out herein are also applicable to all other aspects or exemplary embodiments of the disclosure, where appropriate. In other words, the skilled person reading this specification should consider the optional features for each aspect or exemplary embodiment of the disclosure as interchangeable and combinable between different aspects and exemplary embodiments.

Analytics Filter Information.

[Table 1] provides an example of how analytics filter information may be adapted to enable service experience analytics discrimination at NWDAF.

Examples of the analytic filter information.

| Information | Description | Mandatory App | NS |
|---|---|---|---|
| Application ID (0...max) (NOTE 1) | The identification of the application(s) for which the analytics information is subscribed or requested. | Y | N |
| S-NSSAI | Identifies the network slice for which analytics information is subscribed or requested. | N | Y |
| NSI ID(s) | Identifies the network slice instance(s) for which analytics information is subscribed or requested. | N | N |
| Area of Interest (NOTE 2) | Identifies the Area (i.e., set of TAIs), as defined in TS 23.501 where the analytics information is subscribed or requested. | Y | Y |
| Media/application bandwidth | Identifies the Media/application bandwidth requirement of the application. | N | N |
| DNN | DNN to access the application. | N | N |
| DNAI | Identifier of a user plane access to one or more DN(s) where applications are deployed as defined in TS 23.50. | N | N |

NOTE 1: If no application ID is provided, the rest of Analytics Filter information applies to any application (i.e., all applications) in the network slice.
NOTE 2: Area of interest is not mandatory for application service experience if target of analytics reporting is not set to "any UE."

An analytics target period that indicates the time window for which the statistics or predictions are requested;

In a subscription, the notification correlation ID and the notification target address.

The NWDAF shall notify the result of the analytics to the consumer as specified in 3GPP TS 23.288.

NWDAF collects the network data from AF (directly or via NEF) and from other 5GC NF(s) in order to calculate and provide statistics and predictions on the observed service experience to a consumer NF or to OAM.

Based on the analytics filter information and the target of analytics reporting provided by the service consumer in the analytics subscription or request, NWDAF determines whether service experience analytics should be delivered for i) application(s), ii) network slice, iii) both application(s) and network slice. The details of the discrimination are implementation-specific.

If service experience for both application(s) and network slice is desired but the target of analytics reporting or analytics filter information values (e.g., area of interest) need to be different, separate subscriptions/requests may be provided by the service consumer.

Output Analytics.

By way of example, updates of the Rel-16 NWDAF specification enabling discrimination according to the method according to the first aspect is described below.

The NWDAF services as defined in Rel-16 NWDAF are used to expose the analytics.

Service experience statistics information is defined in Table 2 as defined in Rel-16 NWDAF.

Service experience predictions information is defined in Table 3 as defined in Rel-16 NWDAF.

This information may be updated, as detailed below:

| Rel-16 NWDAF: service experience statistics updated. | |
| --- | --- |
| Information | Description |
| S-NSSAI | Identifies the Network Slice for which analytics information is provided. |
| Slice instance service experiences (0...max) | List of observed service experience information for each Network Slice instance. |
| >NSI ID | Identifies the Network Slice instance within the Network Slice. |
| >Network Slice instance service experience | Service experience across Applications on a Network Slice instance over the Analytics target period (average, variance). |
| >SUPI list (0...SUPImax) | List of SUPI(s) for each slice instance service experience. |
| >Ratio | Estimated percentage of UEs with similar service experience (in the group, or among all UEs). |
| >Spatial validity | Area where the Network Slice service experience analytics applies. |
| >Validity period | Validity period for the Network Slice service experience analytics as defined in clause 6.1.3. |
| Application service experiences (0...max) | List of observed service experience information for each Application. |
| >S -NSSAI | Identifies the Network Slice of the Application |
| >Application ID | Identification of the Application. |
| >Service Experience Type | Type of Service Experience analytics, e.g., on voice, video, other. |
| >Service Experience | Service Experience over the Analytics target period (average, variance). |
| >SUPI list (0...SUPImax) | List of SUPI(s) for each application service experience. |
| >Ratio | Estimated percentage of UEs with similar service experience (in the group, or among all UEs). |
| >Spatial validity | Area where the Application service experience analytics applies. |
| >Validity period | Validity period for the Application service experience analytics as defined in clause 6.1.3. |

| Rel-16 NWDAF: service experience predictions. | |
| --- | --- |
| Information | Description |
| S-NSSAI | Identifies the Network Slice for which analytics information is provided. |
| Network Slice instance service experiences (0...max) | List of observed service experience information for each Network Slice instance. |
| >NSI ID | Identifies the Network Slice instance within the Network Slice. |
| >Network Slice instance service experience | Service experience across Applications on a Network Slice instance over the Analytics target period (average, variance). |
| >SUPI list (0...SUPImax) | List of SUPI(s) for each slice instance service experience. |
| >Ratio | Estimated percentage of UEs with similar service experience (in the group, or among all UEs). |
| >Spatial validity | Area where the Network Slice service experience analytics applies. |
| >Validity period | Validity period for the Network Slice service experience analytics as defined in clause 6.1.3. |
| >Probability assertion | Confidence of this prediction. |
| Application service experiences (0...max) | List of predicted service experience information for each Application. |
| >S-NSSAI | Identifies the Network Slice of the Application |
| >Application ID | Identification of the Application. |
| >Service Experience Type | Type of Service Experience analytics, e.g., on voice, video, other. |
| >Service Experience | Service Experience over the Analytics target period (average, variance). |
| >SUPI list (0...SUPImax) | List of SUPI(s) for each application service experience. |
| >Ratio | Estimated percentage of UEs with similar service experience (in the group, or among all UEs). |
| >Spatial validity | Area where the Application service experience analytics applies. |
| >Validity period | Validity period for the Application service experience analytics as defined in clause 6.1.3. |
| >Probability assertion | Confidence of this prediction. |

NOTE 1: Based on the service experience analytics discrimination, NWDAF may provide the output analytics in Tables 2 and 3 corresponding to network slice, application, or both.
NOTE 2: If multiple network slice instances are not deployed for the S-NSSAI or NSI IDs are not available, only one network slice instance service experience entry is provided. In that case, the NSI ID is not provided and the network slice instance service experience indicates the service experience for the S-NSSAI.
NOTE 3: The SUPI list and ratio in the service experience information for an application can be omitted, if the corresponding parameter(s) is/are provided and with the same value(s) in the service experience information for the slice instance which the application belongs to.

The number of service experiences and SUPIs are limited respectively by the maximum number of objects and the maximum number of SUPIs provided as part of analytics reporting information by the NWDAF service consumer.

FIG. 1 illustrates a network entity according to embodiments of the present disclosure.

Referring to the FIG. 1, the network entity 100 may include a processor 110, a transceiver 120 and a memory 130. However, all of the illustrated components are not essential. The network entity 100 may be implemented by more or less components than those illustrated in FIG. 1. In addition, the processor 110 and the transceiver 120 and the memory 130 may be implemented as a single chip according to another embodiment.

The network entity 100 may correspond to the NWDAF described above.

The aforementioned components will now be described in detail.

The processor 110 may include one or more processors or other processing devices that control the provided function, process, and/or method. Operation of the network entity 100 may be implemented by the processor 110.

The transceiver 120 may include a RF transmitter for up-converting and amplifying a transmitted signal, and a RF receiver for down-converting a frequency of a received signal. However, according to another embodiment, the transceiver 120 may be implemented by more or less components than those illustrated in components.

The transceiver 120 may be connected to the processor 110 and transmit and/or receive a signal. The signal may include control information and data. In addition, the transceiver 120 may receive the signal through a wireless channel and output the signal to the processor 110. The transceiver 120 may transmit a signal output from the processor 110 through the wireless channel.

The memory 130 may store the control information or the data included in a signal obtained by the network entity 100.

The memory 130 may be connected to the processor 110 and store at least one instruction or a protocol or a parameter for the provided function, process, and/or method. The memory 130 may include read-only memory (ROM) and/or random access memory (RAM) and/or hard disk and/or CD-ROM and/or DVD and/or other storage devices.

Although a preferred embodiment has been shown and described, it will be appreciated by those skilled in the art that various changes and modifications might be made without departing from the scope of the disclosure, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims and drawings), or to any novel one, or any novel combination, of the steps of any method or process so disclosed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a network data analytics function (NWDAF) entity, the method comprising:
receiving, from a service consumer entity, at least one request or subscription message for service experience analytics information, wherein the at least one request or subscription message comprises analytics filter information;
in case that the NWDAF entity determines to provide the service experience analytics information for a network slice based on the at least one request or subscription message,
transmitting, to the service consumer entity, the service experience analytics information for the network slice;
in case that the NWDAF entity determines to provide the service experience analytics information for both of the network slice and one or more applications based on the at least one request or subscription message, transmitting, to the service consumer entity, the service experience analytics information for the both; and
in case that the NWDAF entity is unable to differentiate whether to provide service experience analytics information for the one or more applications, the network slice or the both based on the at least one request or subscription message, transmitting the service experience analytics information for the both, and
wherein the service experience analytics information comprises at least one of a first list of service experience information for the one or more applications or a second list of service experience information for the network slice.

2. The method of claim 1,
wherein the analytics filter information comprises identification (ID) information of the one or more applications in case that the request or subscription message for the service experience analytics information is for the one or more applications.

3. The method of claim 1,
wherein the analytics filter information comprises single network slice selection assistance information (S-NSSAI) in case that the request or subscription message for the service experience analytics information is for the network slice.

4. The method of claim 1, wherein the receiving of the at least one request or subscription message comprises:
in case that a value of analytics filter information for the one or more applications is different from a value of analytics filter information for the network slice, or in case that a target of analytics reporting for the one or more applications is different from a target of analytics reporting for the network slice, receiving from the service consumer entity a request or subscription message for service experience analytics information for the one or more applications and a request or subscription message for service experience analytics information for the network slice separately.

5. The method of claim 1, wherein the first list comprises information associated with a first spatial validity of service experience analytics information for the one or more applications, and the second list comprises information associated with a second spatial validity of service experience analytics information for the network slice.

6. The method of claim 1, wherein the first list comprises information associated with a first validity period of service experience analytics information for the one or more applications, and the second list comprises information associated with a second validity period of service experience analytics information for the network slice.

7. A network entity comprising:
memory;
a transceiver; and
at least one processor coupled with the memory and the transceiver, the at least one processor configured to:
receive, from a service consumer entity, at least one request or subscription message for service experience analytics information, wherein the at least one request or subscription message comprises analytics filter information,
in case that the network entity determines to provide the service experience analytics information for a network slice based on the at least one request or subscription message,
transmit, to the service consumer entity, the service experience analytics information for the network slice,
in case that the network entity determines to provide the service experience analytics information for both of the network slice and one or more applications based on the at least one request or subscription message, transmit, to the service consumer entity, the service experience analytics information for the both, and in case that the network entity is unable to differentiate whether to provide service experience analytics information for the one or more applications, the network slice or the both based on the at least one request or subscription message, transmit the service experience analytics information for the both, and wherein the service experience analytics information comprises at least one of a first list of service experience information for the one or more applications or a second list of service experience information for the network slice.

8. The network entity of claim 7, wherein the analytics filter information comprises identification (ID) information of the one or more applications in case that the request or subscription message for the service experience analytics information is for the one or more applications.

9. The network entity of claim 7, wherein the analytics filter information comprises single network slice selection assistance information (S-NS-SAI) in case that the request or subscription message for the service experience analytics information is for the network slice.

10. The network entity of claim 7, wherein the at least one processor is configured to:

in case that a value of analytics filter information for the one or more applications is different from a value of analytics filter information for the network slice, or in case that a target of analytics reporting for the one or more applications is different from a target of analytics reporting for the network slice, receive, from the service consumer entity, a request or subscription message for service experience analytics information for the one or more applications and a request or subscription message for service experience analytics information for the network slice separately.

11. The network entity of claim 7, wherein the first list comprises information associated with a first spatial validity of service experience analytics information for the one or more applications, and the second list comprises information associated with a second spatial validity of service experience analytics information for the network slice.

12. The network entity of claim 7, wherein the first list comprises information associated with a first validity period of service experience analytics information for the one or more applications, and the second list comprises information associated with a second validity period of service experience analytics information for the network slice.

13. The network entity of claim 7, wherein the network entity is a network data analytics function (NWDAF) entity.

* * * * *